US006632009B2

(12) United States Patent
Meyer

(10) Patent No.: US 6,632,009 B2
(45) Date of Patent: Oct. 14, 2003

(54) COAXIAL EXTRUDER DRIVE

(75) Inventor: Helmut Meyer, Troisdorf (DE)

(73) Assignee: Reifenhauser GmbH & Co. Maschinenfabrik, Troisdorf (DE)

( * ) Notice: Subject to any disclaimer, the term of this patent is extended or adjusted under 35 U.S.C. 154(b) by 0 days.

(21) Appl. No.: 09/923,278

(22) Filed: Aug. 6, 2001

(65) Prior Publication Data

US 2002/0064084 A1 May 30, 2002

(30) Foreign Application Priority Data

Aug. 9, 2000 (EP) .............................. 00117045

(51) Int. Cl.[7] ................................. B29B 7/80
(52) U.S. Cl. ...................................... 366/100
(58) Field of Search ......................... 366/69, 79, 100, 366/318, 601; 425/204, 208, 209

(56) References Cited

U.S. PATENT DOCUMENTS 5,217,302 A * 6/1993 Jinping 5,951,928 A * 9/1999 Jinping

FOREIGN PATENT DOCUMENTS

| DE | 44 30 176 | 2/1996 |
| DE | 299 10 332 | 11/2000 |
| JP | 61283524 | 12/1986 |
| JP | 64-74044 | * 3/1989 |

* cited by examiner

Primary Examiner—Charles E. Cooley

(57) ABSTRACT

An extruder has a housing and a screw rotatable in the extruder housing about an axis. A drive has a drive housing fixed to the extruder housing, an extension fixed directly to the screw and extending along the axis into the drive housing, and a sleeve-shaped rotor centered on the axis in the drive housing and coaxially surrounding the screw extension. Structure rotation-ally fixes the rotor directly to the screw extension. A sleeve-shaped stator centered on the axis and fixed in the drive housing coaxially surrounds the rotor. The stator and rotor together form a motor that can rotate the screw about the axis.

6 Claims, 2 Drawing Sheets

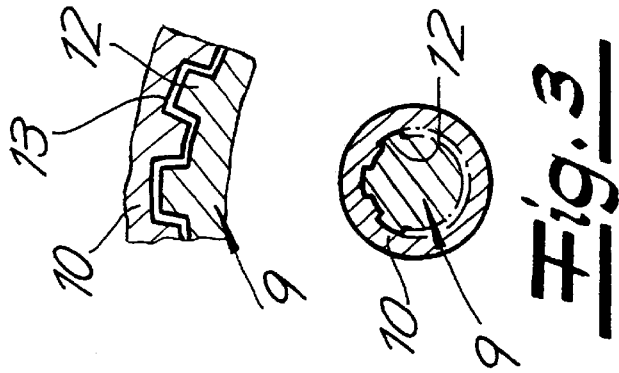
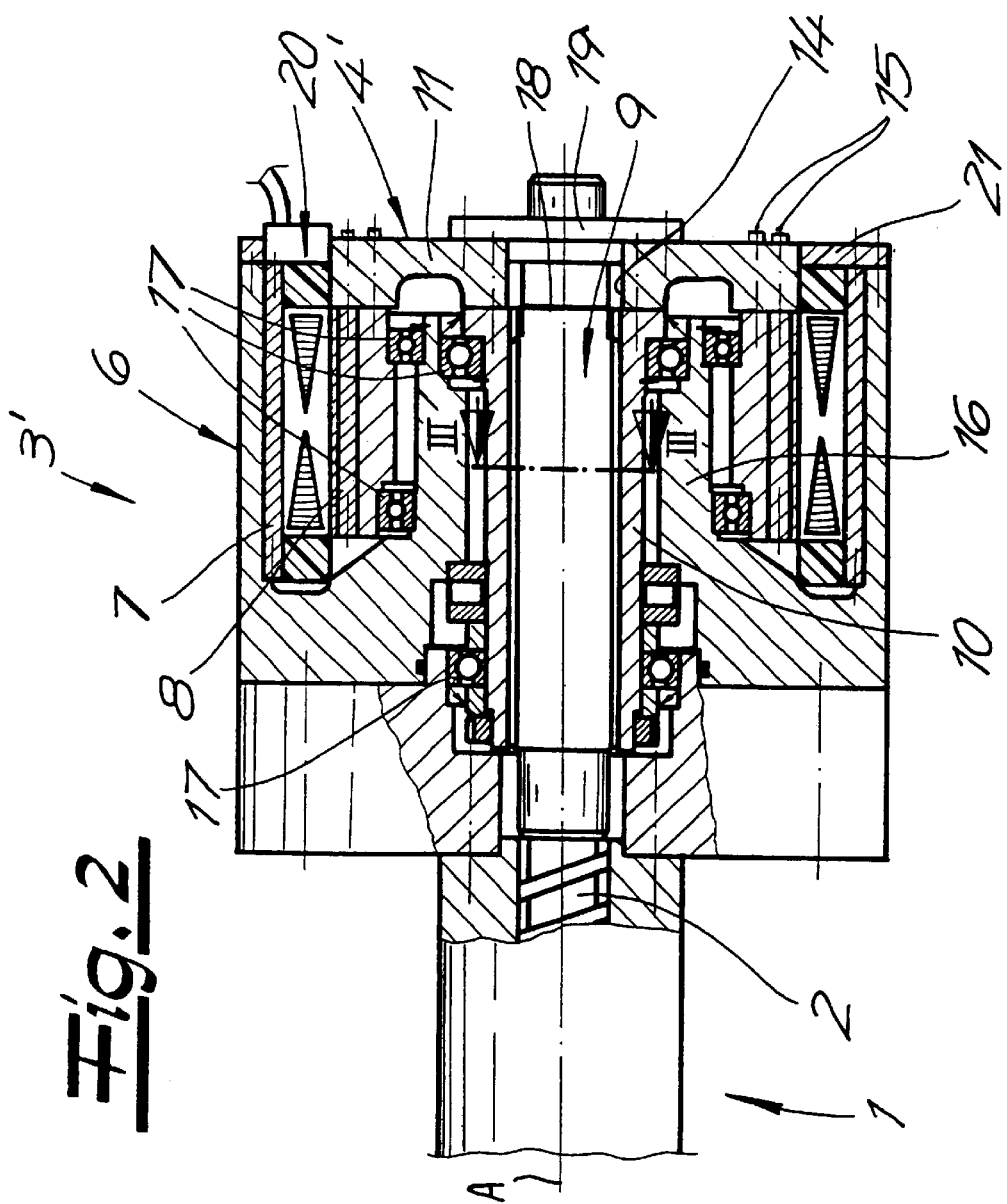

COAXIAL EXTRUDER DRIVE

FIELD OF THE INVENTION

The present invention relates to an extruder. More particularly this invention concerns a drive for an extruder.

BACKGROUND OF THE INVENTION

A standard extruder, for instance used to fill molds with a plastified thermoplastic resin, has a basically tubular housing coaxially receiving a screw. Rotation of this screw simultaneously displaces and plastifies plastic granules fed radially into an upstream portion of the housing and exiting as a hot fluent mass axially from a downstream end of the housing. The screw is rotated at a fairly low speed by a drive typically comprised of a motor whose output shaft is connected through a transmission to the upstream end of the extruder screw.

Thus in the standard system the extruder and its drive are a fairly long and massive assembly. When several extruders must be used together to make a workpiece formed of several different resins in a coextrusion process, it is difficult to find room for the necessary extruders and their drives. Furthermore the bulky transmissions are noisy and require substantial maintenance.

OBJECTS OF THE INVENTION

It is therefore an object of the present invention to provide an improved extruder assembly.

Another object is the provision of such an improved extruder assembly which overcomes the above-given disadvantages, that is which has a substantially simplified drive.

SUMMARY OF THE INVENTION

An extruder has a housing and a screw rotatable in the extruder housing about an axis. A drive has according to the invention a drive housing fixed to the extruder housing, an extension fixed directly to the screw and extending along the axis into the drive housing, and a sleeve-shaped rotor centered on the axis in the drive housing and coaxially surrounding the screw extension. Structure rotationally fixes the rotor directly to the screw extension. A sleeve-shaped stator centered on the axis and fixed in the drive housing coaxially surrounds the rotor. The stator and rotor together form a motor that can rotate the screw about the axis.

Thus with this system the entire drive is coaxial with the extruder screw and mounted directly on the extruder housing, so it is possible to crowd several extruders together for a coextrusion process. The motor, which is electric according to the invention, can generate considerable torque even at a low rotation rate. The coaxial rotor and stator are particularly easy to cool, for instance by pumping water through the drive housing around them, for most efficient operation. The rotor is directly connected, that is without a transmission, to the extruder screw, thereby eliminating a source of substantial noise. Without the transmission, the need for a complex oil-lubrication system is also eliminated.

According to the invention the structure includes a coupling sleeve fixed to the rotor and closely surrounding the screw extension. The sleeve and extension have axially extending and interengaging formations that rotationally couple them to each other. These formations are typically angularly equispaced and of complementary shape for good rotational interconnection of the sleeve and extension. Such splining together of these two parts makes it easy to separate them axially from each other for servicing of the extruder.

The structure further comprises a plate extending generally perpendicular to the axis and fixed to the coupling sleeve and to the rotor. Screws or bolts secure this coupling plate with the sleeve and with the rotor. More particularly the plate is annular and has a central hold big enough that the screw and extension can be pulled axially out through it. Thus the drive does not get in the way when the screw has to be replaced or serviced. This makes it possible to draw the screw out of the upstream or rear end of the extruder housing, as is standard so the connection of the extruder to the mold does not have to be undone. A cover is provided that normally closes this hole, and that can in fact help secure the screw axially to the coupling sleeve and rotor.

The extruder housing includes an annular collar projecting axially between the extension and the rotor and having cylindrical or cylindrically stepped inner and outer surfaces centered on the axis. Bearings on the collar support the sleeve and extension rotatably thereon. These bearings are typically roller bearings set up, at least for the sleeve, to resist both axial and radial forces.

The assembly according to the invention further comprises a cover plate removably secured to the drive housing and engaged axially over the stator. The stator is removable from the drive housing when the cover plate is removed.

BRIEF DESCRIPTION OF THE DRAWING

The above and other objects, features, and advantages will become more readily apparent from the following description, reference being made to the accompanying drawing in which:

FIG. 2 is a larger-scale sectional view through the drive parts of the extruder assembly according to the invention;

FIG. 3 is a section taken along line III—III of FIG. 2; and

FIG. 4 is a large-scale view of a detail of FIG. 3.

SPECIFIC DESCRIPTION

Figure 1:
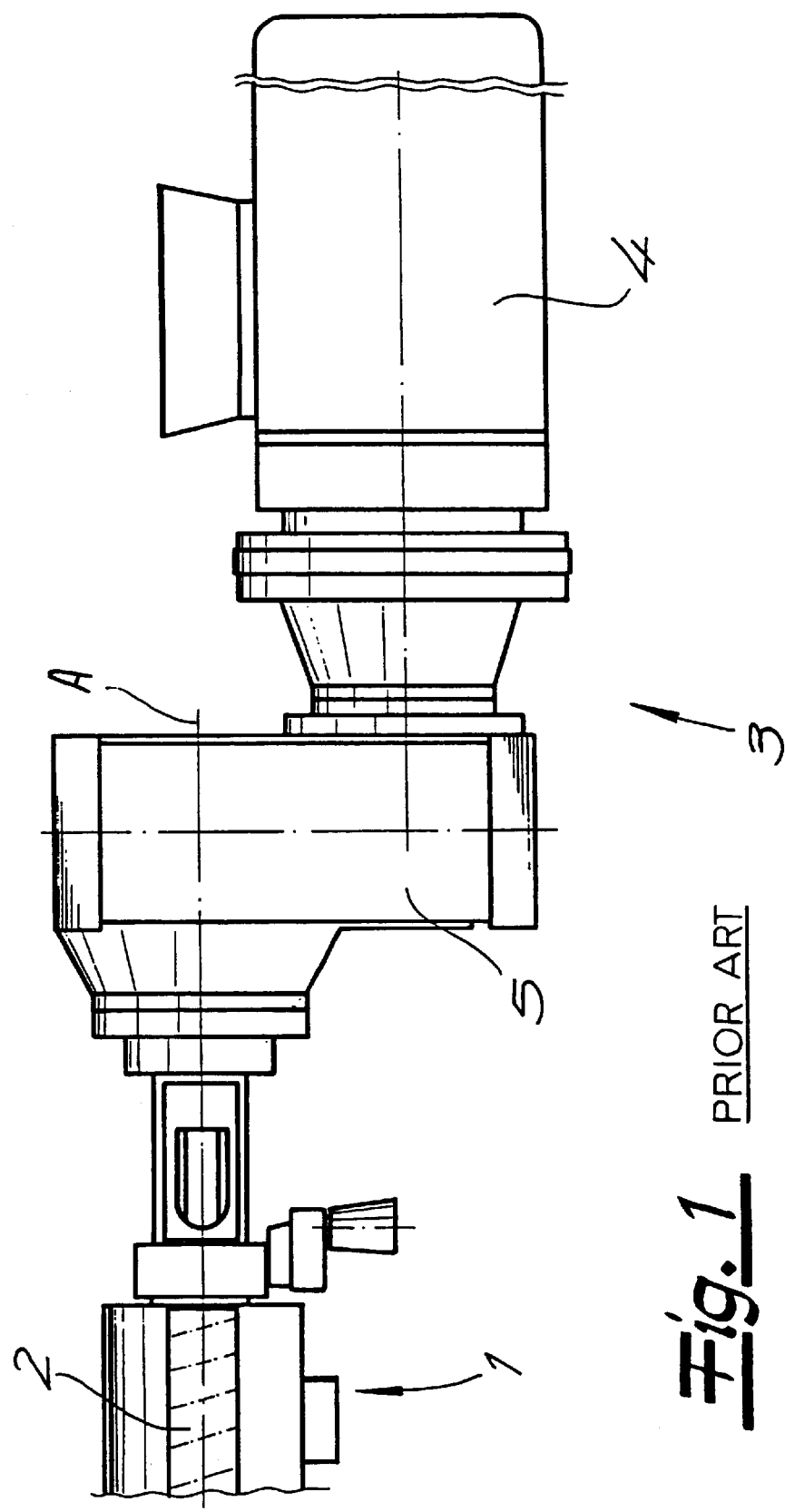
FIG. 1 is a small-scale side view of a prior-art extruder assembly according to the invention.

As seen in FIG. 1 a prior-art extruder comprises a tubular extruder housing 1 centered on an axis A and coaxially receiving a rotatable worm or screw 2. A drive 3 has an electric motor 4 offset from the axis A and having an output shaft connected to the input of a transmission 5 whose output in turn is connected to the rear or upstream end of the screw 2. Thus the motor 4 can rotate the screw 2 about the axis A. This assembly is clearly quite bulky.

According to the invention as shown in FIG. 2 a drive housing 6 centered on the axis A is fixed directly to the extruder housing 1 and holds a cylindrical sleeve-shaped stator 7 and, coaxially inside it, a cylindrical sleeve-shaped rotor 8. The screw 2 has a rear end extension 9 to which this rotor 8 is connected so that the motor 4' formed by the stator 7 and rotor 8 can directly drive the screw 2.

More particularly the shaft extension 9 is formed with axially extending and radially outwardly projecting ridges or splines 12 (FIGS. 3 and 4) that fit in axially extending and radially inwardly open grooves 13 of a sleeve 10 centered on the axis A and supported by axial- and radial-thrust bearings 17 on an inner surface of a tubular rearward collar or part 16 of this housing 6. This part 16 is unitary with the housing 6 and coaxially surrounds the extension 9 and sleeve 10. The rear end of this sleeve 10 is secured by bolts 15 to an end plate 11 lying in a plane perpendicular to the axis A and secured by more bolts 15 to the rotor 8 which is supported by further roller bearings 17 on an outside surface of the tubular housing part 16.

This plate 11 is formed with a central hole 14 of large enough diameter that the entire worm 9 with its extension can pass axially through it for repair, servicing, or replacement. To this end the extension 9 is of somewhat greater diameter than the screw 2. This hole 14 is covered by a plate 19 secured to the end of the extension 9 by a screw 18. In addition an annular plate or washer 21 covers a rear end 20 of the stator 7 to hold it in place in the housing 6. When this cover plate 21 is removed by withdrawal of appropriate screws, the stator 7 can be pulled axially out of the housing 6 for servicing or replacement.

Thus the rotationally fixed stator 7 exerts torque on the rotor 8 tending to rotate it about the axis A relative to the housing 6, as permitted by the bearings 17. This torque is transmitted by the plate 11 to the sleeve 10 secured by the splines 12 and grooves 13 to the extension 9 fixed on the end of the worm 2, thereby rotating the worm 2 with the rotor 8.

I claim:

1. In combination with an extruder having a housing and a screw rotatable in the extruder housing about an axis, a drive comprising:

a drive housing fixed to the extruder housing;

an extension fixed directly to the screw and extending along the axis into the drive housing;

a sleeve-shaped rotor centered on the axis in the drive housing and coaxially surrounding the screw extension;

a coupling sleeve fixed to the rotor and closely surrounding the screw extension;

axially extending and interengaging formations rotationally coupling the coupling sleeve and the extension to each other;

an end plate extending generally perpendicular to the axis and fixed to the coupling sleeve and to the rotor, the coupling sleeve and the plate rotationally fixing the rotor directly to the screw extension; and a sleeve-shaped stator centered on the axis, fixed in the drive housing, and coaxially surrounding the rotor, the stator and rotor together forming a motor that can rotate the screw about the axis.

2. The extruder drive defined in claim 1 wherein the extruder housing includes an annular collar projecting axially between the extension and the rotor, the drive further comprising:

bearings on the collar and supporting the sleeve and extension rotatably thereon.

3. The extruder drive defined in claim 1 wherein the end plate is formed at the axis with an axially throughgoing hole through which the screw and screw extension can pass axially and the drive further comprises:

a cover releasably secured over the hole.

4. The extruder drive defined in claim 1, further comprising a cover plate separate from the end plate and removably secured to the drive housing and engaged axially over the stator, the stator being removable from the drive housing when the cover plate is removed.

5. The extruder drive defined in claim 1 wherein the stator is a coil and the rotor includes a magnet.

6. In combination with an extruder having a housing and a screw rotatable in the extruder housing about an axis, a drive comprising:

a drive housing fixed to the extruder housing;

an extension fixed directly to the screw and extending along the axis into the drive housing;

a sleeve-shaped rotor centered on the axis in the drive housing and coaxially surrounding the screw extension;

a plate extending generally perpendicular to the axis, fixed to the screw extension and to the rotor, rotationally fixing the rotor directly to the screw extension, and formed at the axis with an axially throughgoing hole through which the screw and screw extension can pass axially;

a cover releasably secured over the hole; and a sleeve-shaped stator centered on the axis, fixed in the drive housing, and coaxially surrounding the rotor, the stator and rotor together forming a motor that can rotate the screw about the axis.

\* \* \* \* \*